United States Patent
Kwilosz

(10) Patent No.: US 6,799,931 B2
(45) Date of Patent: Oct. 5, 2004

(54) TREE FASTENER WITH FLEXIBLE TAB CONTROL

(75) Inventor: Mark J. Kwilosz, Frankfort, IL (US)

(73) Assignee: Illinois Tool Works Inc., Glenview, IL (US)

(*) Notice: Subject to any disclaimer, the term of this patent is extended or adjusted under 35 U.S.C. 154(b) by 249 days.

(21) Appl. No.: 09/946,932

(22) Filed: Sep. 5, 2001

(65) Prior Publication Data

US 2003/0044259 A1 Mar. 6, 2003

(51) Int. Cl.$^7$ ................................................ F16B 19/00
(52) U.S. Cl. .......................... 411/510; 411/508; 24/453
(58) Field of Search ............................. 411/21, 41, 45, 411/48, 508–510, 913, 970, 999; 24/453, 297

(56) References Cited

U.S. PATENT DOCUMENTS

| | | | |
|---|---|---|---|
| 1,177,272 A | | 3/1916 | Robbins |
| 1,957,141 A | | 5/1934 | Jordan |
| 2,181,222 A | | 11/1939 | Winkler |
| 2,451,591 A | * | 10/1948 | Tinnerman |
| 3,693,494 A | * | 9/1972 | Meyer |
| 4,517,711 A | * | 5/1985 | Tanaka |
| 4,688,337 A | | 8/1987 | Dillner et al. |
| 4,728,068 A | * | 3/1988 | Rivkin |
| 4,776,739 A | | 10/1988 | Hamman |
| 4,902,182 A | | 2/1990 | Lewis |
| 4,924,561 A | * | 5/1990 | Yoneyama |
| 4,936,530 A | * | 6/1990 | Wollar |
| 5,306,098 A | | 4/1994 | Lewis |
| 5,393,185 A | | 2/1995 | Duffy, Jr. |
| 5,468,108 A | | 11/1995 | Sullivan et al. |
| 5,497,965 A | | 3/1996 | Mathieu, Jr. |
| 5,718,025 A | | 2/1998 | Courtin |
| 5,907,891 A | | 6/1999 | Meyer |
| 6,119,306 A | | 9/2000 | Antonucci et al. |

* cited by examiner

Primary Examiner—Flemming Saether
(74) Attorney, Agent, or Firm—Pitney, Hardin, Kipp & Szuch LLP

(57) ABSTRACT

The tree fastener includes split wing fasteners which engage a passageway in a clip base, including flashgates in the passageway which were formed in the molding process initially joining the tree fastener and the clip base prior to driving to the pre-driven position, and further engage a structural aperture in the driven position. The tree fastener further includes a flexible tab which is joined to the tree fastener near the tip of the tree fastener and which extends upwardly within a slot in the shank of the tree fastener and extends through the head of the tree fastener. The flexible tab includes two generally radially outwardly extending interference bumps which engage one of the flashgates in the pre-driven position. The flexible tab can be manually moved radially inwardly so that the interference bumps release the flashgate so that the tree fastener can be urged to the fully driven position.

20 Claims, 5 Drawing Sheets

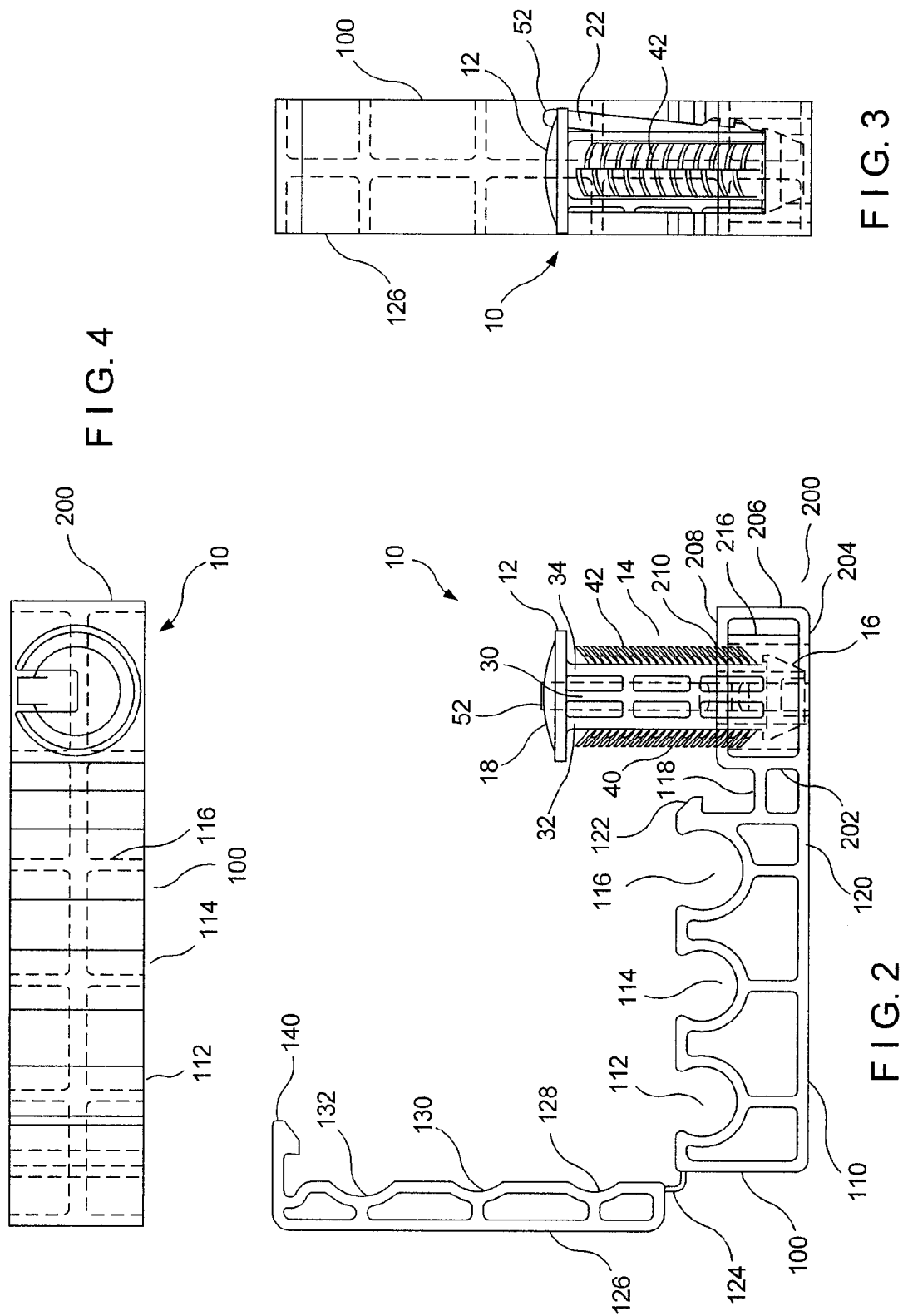

TREE FASTENER WITH FLEXIBLE TAB CONTROL

BACKGROUND OF THE INVENTION

1. Field of the Invention

This invention pertains to a tree-type fastener which includes a flexible tab with interference bumps which cooperate with flashgates to control the drive of the tree fastener from the pre-driven to the driven position.

2. Description of the Prior Art

Tree fasteners are known in the prior art, such as U.S. Pat. No. 5,907,891 entitled "Tree Fastener with Split Wings" issued on Jun. 1, 1999 to Meyer. However, these tree fasteners are frequently manufactured as single stand-alone piece, and do not include related fasteners or hardware which are to be secured by the tree fastener, such as, for instance, brake and fuel line retainers for automotive applications. Moreover, these tree fasteners frequently do not include the structure to control the driving of the fastener from the pre-driven to the driven position.

SUMMARY AND OBJECTS OF THE INVENTION

It is therefore an object of the present invention to provide a tree fastener which is manufactured and provided with associated hardware, with the tree fastener formed in a predriven position with respect to the associated hardware.

It is therefore a further object of the present invention to provide a tree fastener with an element to control the driving from the pre-driven to the driven positions.

It is therefore a still further object of the present invention to provide a tree fastener with associated hardware, which is simple and intuitive to operate.

It is therefore a still further object of the present invention to provide a tree fastener with associated hardware, which is economical to manufacture.

These and other objects are attained by providing a tree fastener which is molded along with associated hardware, such as a brake and fuel line retainer for automotive applications. In the pre-driven position, flashgates in the associated hardware engage interference bumps on a flexible tab. The interference bumps, cooperating with the flashgates, control the final drive of the tree fastener into the associated hardware.

BRIEF DESCRIPTION OF THE DRAWINGS

Further objects and advantages of the invention will become apparent from the following description, and from the accompanying drawings, wherein:

FIG. 2 is a plan view of the tree fastener of the present invention, shown with the retainer in an open position.

FIG. 3 is a side view of the tree fastener of the present invention, shown with the retainer in an open position.

FIG. 4 is a top view of the tree fastener of the present invention, shown with the retainer in an open position.

DETAILED DESCRIPTION OF THE PREFERRED EMBODIMENT

Figure 1:
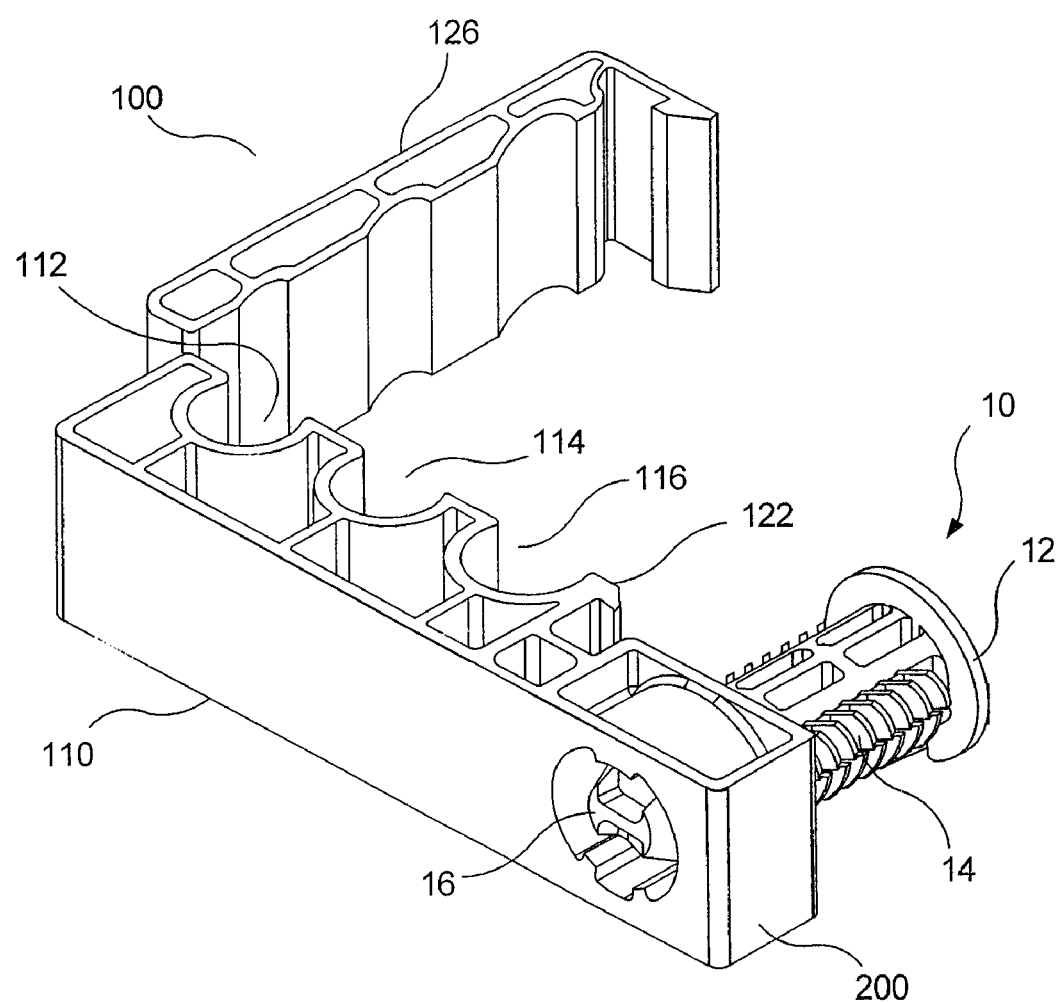
FIG. 1 is a perspective view of the tree fastener of the present invention, shown in the pre-driven position, with associated hardware of a brake and fuel line retainer, such as would be used in an automotive application.
Figure 5:
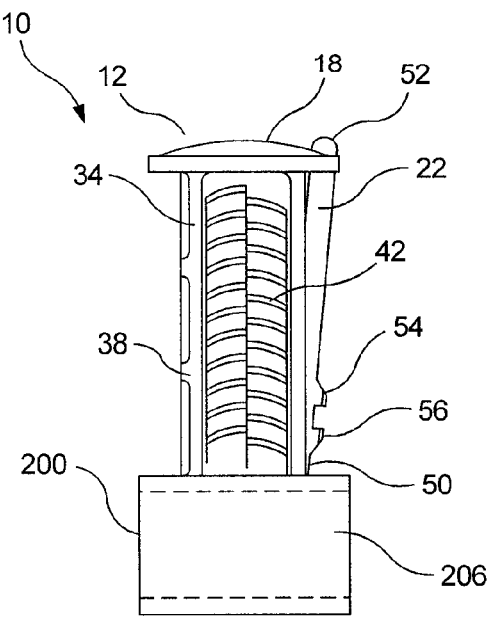
FIG. 5 is a side view of the tree fastener of the present invention, shown in the as-molded position, and including a clip base.
Figure 6:
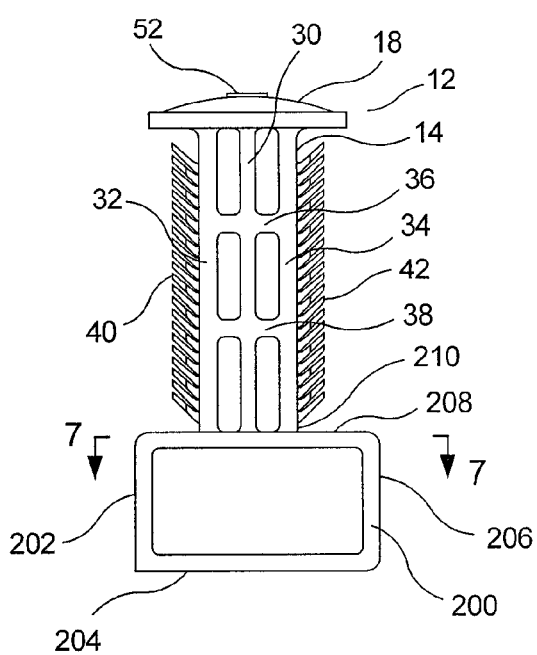
FIG. 6 is a side view of the tree fastener of the present invention, orthogonal to the side view of FIG. 5, shown in the as-molded position, and including a clip base.
Figure 8:
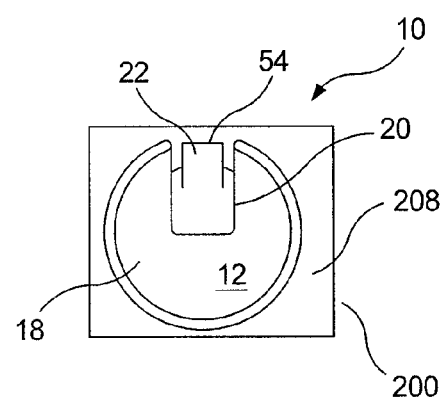
FIG. 8 is a top view of the tree fastener of the present invention.
Figure 10:
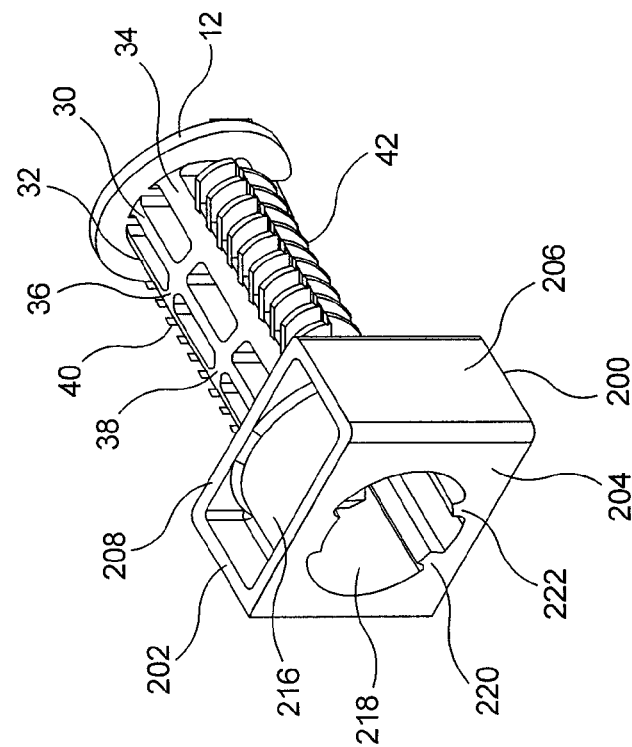
FIG. 10 is a bottom perspective view of the tree fastener of the present invention, shown in the as-molded position, and including a clip base.
Figure 9:
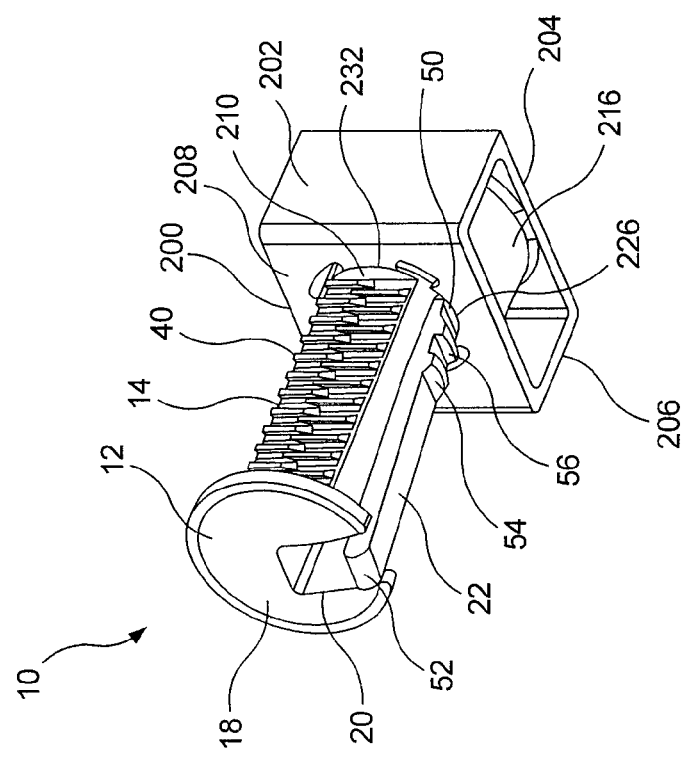
FIG. 9 is a top perspective view of the tree fastener of the present invention, shown in the as-molded position, and including a clip base.
Figure 12:
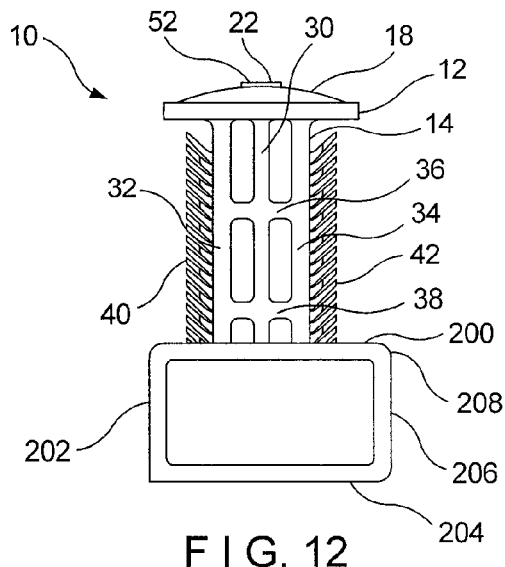
FIG. 12 is a side view of the tree fastener of the present invention, orthogonal to the side view of FIG. 11, shown in the pre-driven position, and including a clip base.
Figure 11:
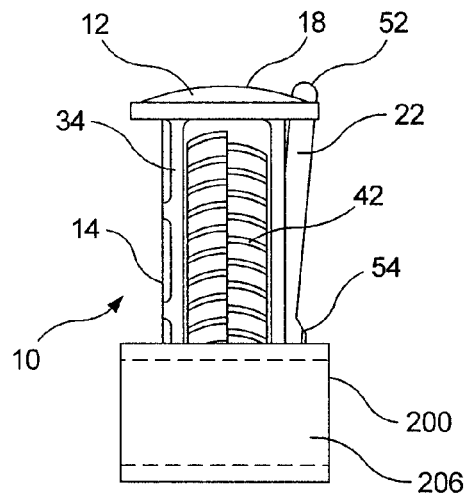
FIG. 11 is a side view of the tree fastener of the present invention, shown in the pre-driven position, and including a clip base.
Figure 13:
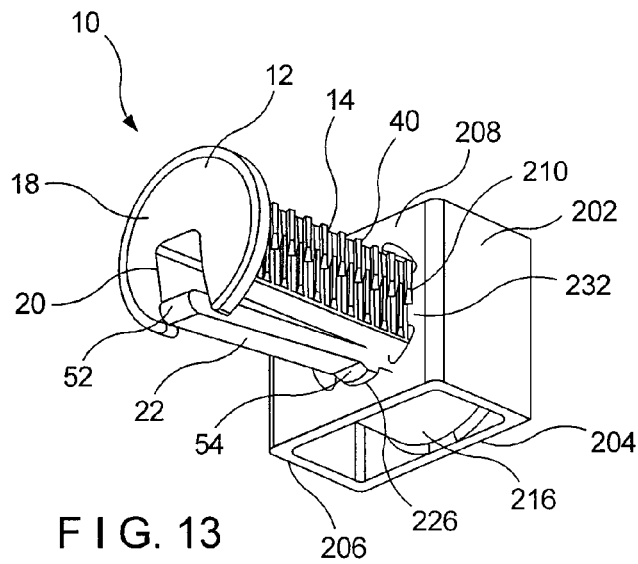
FIG. 13 is a top perspective view of the tree fastener of the present invention, shown in the pre-driven position, and including a clip base.
Figure 14:
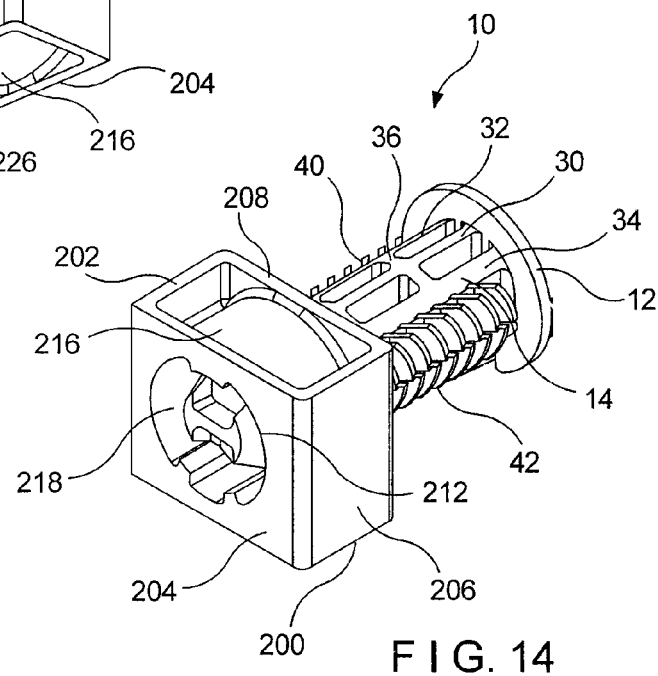
FIG. 14 is a bottom perspective view of the tree fastener of the present invention, shown in the pre-driven position, and including a clip base.

Referring now to the drawings in detail wherein like numerals indicate like elements throughout the several views, one sees that FIG. 1 is a perspective view of the pre-driven configuration of the tree fastener 10 of the present invention, which is typically molded and supplied with auxiliary hardware, such as a brake and fuel line retainer 100. Tree fastener 10 and auxiliary hardware are typically initially integrally molded from nylon 6/6 or a similar material and those skilled in the art will recognize a range of equivalent substitutions. Tree fastener 10 includes head 12, shank 14 and tip 16. Head 12 is generally round with a slightly protruding convex arcuate upper surface 18. As shown in FIGS. 8 and 9, slot 20 is formed generally radially along head 12 and extends into shank 14 to allow for the travel of flexible tab 22. As shown in FIGS. 6 and 10, shank 14 is formed from central longitudinal wall 30 parallel to side longitudinal walls 32, 34. Longitudinal walls 30, 32, 34 extend from head 12 and are separated by transverse ribs 36, 38. The exterior of side longitudinal walls 32, 34 include series of wings 40, 42 which are typically split into wing halves which extend from shank 14 at different angles as disclosed in U.S. Pat. No. 5,907,891 entitled "Tree Fastener with Split Wings" issued on Jun. 1, 1999 to Meyer, the disclosure of which is hereby incorporated herein by reference.

A portion of central longitudinal wall 30 is removed to further form slot 20 for the travel of flexible tab 22. Proximal end 50 of flexible tab 22 is integral with tip 16 of tree fastener 10 while distal end 52 protrudes through slot 20 extending above upper surface 18 of head 12. Interference bumps 54, 56 extend generally radially outward from flexible tab 22.

Associated hardware formed with tree fastener 10, such as brake and fuel line retainer 100, typically includes clip base 200 or a similar structure. Clip base 200 is typically formed integrally with the associated hardware. Clip base 200 includes sidewalls 202, 206, lower wall 204 and upper wall 208 in a generally rectangular configuration. Opening 210 is formed in upper wall 208 and opening 212 is formed in lower wall 204. Cylindrical walls 216 join openings 210, 212 thereby forming passageway 218. As shown in FIG. 10, the interior of cylindrical walls 216 includes two anti-rotation ribs 220, 222 which define the path in which flexible tab 22 travel during the insertion of tree fastener 10 into passageway 218.

Figure 7:
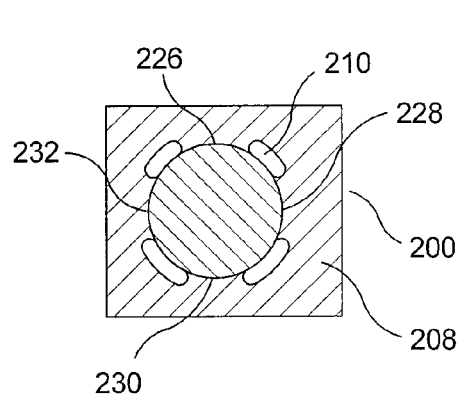
FIG. 7 is a cross-sectional view along plane 7—7 of FIG. 6, showing the flashgates which connect the tree fastener and the base clip in the as-molded position.

Furthermore, as shown in FIGS. 6, 7 and 9, tree fastener 10 is initially molded integrally with flashgates 226, 228, 230, 232. However, after flashgates 226, 228, 230, 232 are broken by tree fastener 10 being driven to the pre-driven position of FIGS. 1–4 and 11–14, the vestiges of flashgates 226, 228, 230, 232 remain. In particular, flashgate 226 is engaged between interference bumps 54, 56 of flexible tab 22 thereby inhibiting the further insertion of tree fastener 10 to the driven position until flexible tab 22 is manually or otherwise moved radially inward in slot 20 to allow interference bumps 54, 56 to release from flashgate 226. As tree fastener 10 is driven further into passageway 218, wings 40, 42 engage flashgates 228, 232.

The brake and fuel line retainer 100 as illustrated in FIG. 2 includes a lower section 110 with three partially circular portions 112, 114, 116 which span about 270° for engaging cylindrical lines such as fuel or brake lines (not shown) in an automotive application. Moreover, lower section 110 is secured to clip base 200 by integral supports 118, 120. Lower detent head 122 is formed adjacent to partially circular portion 116. Living hinge 124 integrally attaches upper section 126 to lower section 110. Upper section 126 has three upper partially circular portions 128, 130, 132 which span about 90° and align with partially circular portions 112, 114, 116 in the closed position to complete the 360° about the cylindrical lines. Upper section 126 further includes upper detent head 140 which snap detent engages lower detent head 122 in the closed position.

Tree fastener 10 is typically molded integrally with the associated hardware, such as clip base 200 and further possibly including retainer 100, as shown in the "as-molded" configuration of FIGS. 5–10. A pre-driving operation then breaks the flashgates 226, 228, 230, 232 and forces tree fastener 10 to the pre-driven position shown in FIGS. 1–4 and 11–14. The user typically receives the tree fastener 10 in this pre-driven position from the manufacturer. The user then typically aligns passageway 218 with a structural aperture of a similar diameter (not shown), manually urges flexible tab 20 radially inward, and drives tree fastener 10 further into passageway 218 so that wings 40, 42 engage passageway 218, including flashgates 226, 228, 230, 232 and further engage the structural aperture (not shown) thereby securing clip base 200 to the structure surrounding structural aperture. The user then places the various fuel, brake and/or other lines into partially circular portions 112, 114, 116 and closes upper section 126 to lower section 110 such that lower detent head 122 and upper detent head 140 snap detent engage with each other. In some applications, the installers may reverse steps such that the various lines are engaged prior to the driving of tree fastener 10 into the structural aperture.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A fastener including;
   a head;
   a shank extending from said head, said shank including wings extending from said shank, said shank terminating in a tip;
   a slot formed in said head and extending through a portion of said shank and terminating at a position offset from a distal end of said tip; and
   a tab including a proximal end affixed within said slot at said position offset from said distal end of said tip and a distal end of said tab extending through said slot in said head, said tab further including an interference bump extending generally radially outwardly.

2. The fastener of claim 1 wherein said tab is flexible and can be moved from a first position wherein said interference bump extends radially beyond said shank thereby inhibiting movement of the fastener through a passageway to a second position wherein said interference bump is within said slot thereby allowing the fastener to move within a passageway.

3. The fastener of claim 2 wherein said wings are formed on opposed sides of said shank and further have a split configuration with wing halves extending from said shank at different angles.

4. The fastener of claim 3 further including a clip base which includes a passageway through which said shank extends, wherein said clip base is initially integrally molded with said shank and flashgates are formed between said shank and said clip base.

5. The fastener of claim 4 wherein said flashgates are broken when the shank is driven to a pre-driven position.

6. The fastener of claim 5 wherein said interference bump engages a vestige of one of said flashgates in the pre-driven position.

7. The fastener of claim 6 wherein said interference bump includes two interference bumps which engage said vestige of one of said flashgates in the pre-driven position until said tab is moved to said second position.

8. The fastener of claim 7 wherein said passageway includes axially oriented ribs which inhibit rotation of said shank within said aperture.

9. The fastener of claim 1 wherein said tab includes a flexible expanse between said proximal end and said distal end, wherein movement of said distal end through said slot causes flexing of said flexible expanse.

10. The fastener of claim 9 wherein movement of said distal end through said slot causes substantially no movement of said proximal end.

11. A fastener including;
    a head;
    a shank extending from said head, said shank including wings extending from said shank, said shank terminating in a tip;
    a slot formed in said head and extending through a portion of said shank and terminating at a position offset from a distal end of said tip; and
    a tab including a proximal end integrally formed with said shank within said slot at said position offset from a distal end of said tip and a distal end of said tab extending through said slot in said head, said tab further including an interference bump extending generally radially outwardly.

12. The fastener of claim 11 wherein said tab is flexible and can be moved from a first position wherein said interference bump extends radially beyond said shank thereby inhibiting movement of the fastener through a passageway to a second position wherein said interference bump is within said slot thereby allowing the fastener to move within a passageway.

13. The fastener of claim 12 wherein said wings are formed on opposed sides of said shank and further have a split configuration with wing halves extending from said shank at different angles.

14. The fastener of claim 13 further including a clip base which includes a passageway through which said shank extends, wherein said clip base is initially integrally molded with said shank and flashgates are formed between said shank and said clip base.

15. The fastener of claim 14 wherein said flashgates are broken when the shank is driven to a pre-driven position.

16. The fastener of claim 15 wherein said interference bump engages a vestige of one of said flashgates in the pre-driven position.

17. The fastener of claim 16 wherein said interference bump includes two interference bumps which engage said vestige of one of said flashgates in the pre-driven position until said tab is moved to said second position.

18. The fastener of claim 17 wherein said passageway includes axially oriented ribs which inhibit rotation of said shank within said aperture.

19. The fastener of claim 11 wherein said tab includes a flexible expanse between said proximal end and said distal end, wherein movement of said distal end through said slot causes flexing of said flexible expanse.

20. The fastener of claim 19 wherein movement of said distal end through said slot causes substantially no movement of said proximal end.

* * * * *